United States Patent
Bertschinger et al.

(10) Patent No.: US 11,644,541 B2
(45) Date of Patent: May 9, 2023

(54) EMITTING DEVICE FOR A SCANNING OPTICAL DETECTION SYSTEM OF A VEHICLE, DETECTION SYSTEM, DRIVER ASSISTANCE SYSTEM, AND METHOD FOR OPTICALLY SCANNING A MONITORING REGION

(71) Applicant: Valeo Schalter und Sensoren GmbH, Bietigheim-Bissingen (DE)

(72) Inventors: Bernd Bertschinger, Bietigheim-Bissingen (DE); Daniel Stricker-Shaver, Bietigheim-Bissingen (DE); Jan Simon, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 560 days.

(21) Appl. No.: 16/632,713

(22) PCT Filed: Jul. 24, 2018

(86) PCT No.: PCT/EP2018/069969
§ 371 (c)(1),
(2) Date: Jan. 21, 2020

(87) PCT Pub. No.: WO2019/020591
PCT Pub. Date: Jan. 31, 2019

(65) Prior Publication Data
US 2021/0165080 A1    Jun. 3, 2021

(30) Foreign Application Priority Data

Jul. 24, 2017 (DE) .................... 10 2017 116 598.3

(51) Int. Cl.
*G01S 7/481* (2006.01)
*G01S 17/931* (2020.01)
(Continued)

(52) U.S. Cl.
CPC .......... *G01S 7/4817* (2013.01); *G01S 7/4815* (2013.01); *G01S 7/499* (2013.01); *G01S 17/42* (2013.01); *G01S 17/931* (2020.01); *G01S 1/00* (2013.01)

(58) Field of Classification Search
CPC .... G01S 7/4817; G01S 17/931; G01S 7/4815; G01S 7/499; G01S 17/42; G01S 1/00
See application file for complete search history.

(56) References Cited

U.S. PATENT DOCUMENTS

| | | | | |
|---|---|---|---|---|
| 5,818,627 | A | * | 10/1998 | Perlo .................... G02B 26/002 359/619 |
| 2005/0121892 | A1 | | 6/2005 | Li et al. |

(Continued)

OTHER PUBLICATIONS

International Search Report and Written Opinion in corresponding International Application No. PCT/EP2018/069969, dated Oct. 24, 2018 (11 pages).

(Continued)

*Primary Examiner* — Behrang Badii
*Assistant Examiner* — Jay Khandpur
(74) *Attorney, Agent, or Firm* — Osha Bergman Watanabe & Burton LLP

(57) ABSTRACT

An emitting device (26) for a scanning optical detection system of a vehicle for monitoring at least one monitoring region (14) for objects is described, having at least one light source (40a, 40b) for generating at least one optical emission signal (32a, 32b) and having at least one diffraction unit (50a, 50b), which has a diffractive effect on the at least one emission signal (32a, 32b), for controlling at least one beam direction (66a, 66b) of the at least one emission signal (32a,

(Continued)

32b). At least one diffraction unit (50a, 50b) which is settable to set the beam directions (66a, 66b) associated with the respective signal paths (41a, 41b), is arranged in at least two different signal paths (41a, 41b) of one emission signal or various emission signals (32a, 32b). At least one beam alignment unit (38) is arranged in the respective signal paths (41a, 41b) after the at least one diffraction unit (50a, 50b) to align the set beam directions (66a, 66b) in the at least one monitoring region (14) while maintaining at least one angle offset between the set beam directions (66a, 66b) generated before the at least one beam alignment unit (38) or to generate at least one angle offset between the set beam directions.

14 Claims, 8 Drawing Sheets

(51) Int. Cl.
  *G01S 7/499* (2006.01)
  *G01S 17/42* (2006.01)
  *G01S 1/00* (2006.01)

(56) References Cited

U.S. PATENT DOCUMENTS

| | | |
|---|---|---|
| 2006/0227317 A1 | 10/2006 | Henderson et al. |
| 2012/0188467 A1 | 7/2012 | Escuti et al. |
| 2013/0208256 A1 | 8/2013 | Mamidipudi et al. |
| 2015/0346340 A1 | 12/2015 | Yaacobi et al. |
| 2016/0097930 A1* | 4/2016 | Robbins ............. G02B 27/0172 359/619 |
| 2016/0146941 A1* | 5/2016 | Hassenpflug ......... G01S 17/931 342/54 |
| 2016/0161600 A1 | 6/2016 | Eldada et al. |
| 2016/0320488 A1* | 11/2016 | Slobodyanyuk ........ G01S 17/42 |
| 2017/0003392 A1 | 1/2017 | Bartlett et al. |
| 2017/0180707 A1* | 6/2017 | Hsu .................. H04N 5/232939 |
| 2019/0004153 A1* | 1/2019 | Kaestner ............... G01S 7/4816 |
| 2019/0033522 A1* | 1/2019 | Baba ...................... G02F 1/2955 |
| 2019/0391271 A1* | 12/2019 | Goodwill ............ G01S 17/90 |

OTHER PUBLICATIONS

German Search Report in corresponding German Application No. 10 2017 116 598.3, dated May 24, 2018 (7 pages).

* cited by examiner

EMITTING DEVICE FOR A SCANNING OPTICAL DETECTION SYSTEM OF A VEHICLE, DETECTION SYSTEM, DRIVER ASSISTANCE SYSTEM, AND METHOD FOR OPTICALLY SCANNING A MONITORING REGION

TECHNICAL AREA

The invention relates to an emitting device for a scanning optical detection system of a vehicle for monitoring at least one monitoring region for objects, having at least one light source for generating at least one optical emission signal and having at least one diffraction unit, which has a diffractive effect on the at least one emission signal, for controlling at least one beam direction of the at least one emission signal.

Furthermore, the invention relates to a scanning optical detection system of a vehicle for monitoring a monitoring region for objects, comprising
- at least one emitting device, having at least one light source for generating at least one optical emission signal and having at least one diffraction unit, which has a diffractive effect on the at least one emission signal, for controlling at least one beam direction of the at least one emission signal,
- at least one receiving device for receiving at least one optical reception signal, which originates from at least one emission signal that is reflected on an object,
- and at least one control and/or analysis unit for controlling the at least one emitting device and/or the at least one receiving device and/or for analysing reception signals received using the at least one receiving device.

Moreover, the invention relates to a driver assistance system of a vehicle,
- having at least one scanning optical detection system for monitoring a monitoring region for objects, wherein the at least one detection system comprises
- at least one emitting device, having at least one light source for generating at least one optical emission signal and having at least one diffraction unit, which has a diffractive effect on the at least one emission signal, for controlling at least one beam direction of the at least one emission signal,
- at least one receiving device for receiving at least one optical reception signal, which originates from at least one emission signal that is reflected on an object,
- and at least one control and/or analysis unit for controlling the at least one emitting device and/or the at least one receiving device and/or for analysing reception signals received using the at least one receiving device,
- wherein the driver assistance system comprises at least one control and/or analysis unit for processing items of object information acquired using the at least one detection system. Furthermore, the invention relates to a method for optically scanning a monitoring region for objects using a detection system of a vehicle, in which at least one optical emission signal is generated and is diffracted using at least one diffraction unit having a diffractive effect to control at least one beam direction of the at least one emission signal.

PRIOR ART

A LIDAR-based system and a method are known from US 20160161600 A1, which are used for beamforming and control of laser beams, in which an optical phased array (OPA) photonic integrated circuit (PIC) is used and the detection of laser beams is performed using photodetectors.

The invention is based on the object of designing an emitting device, a detection system, a driver assistance system, and a method of the type mentioned at the outset, in which the emission energy of the at least one light source can be utilized more efficiently and an aperture angle of a field of view of the detection system can be enlarged overall.

DISCLOSURE OF THE INVENTION

The object is achieved according to the invention in the emitting device in that
- at least one diffraction unit, which is settable to set the beam directions associated with the respective beam paths, is arranged in at least two different signal paths of one emission signal or various emission signals,
- at least one beam alignment unit for aligning the set beam directions in the at least one monitoring region is arranged in the respective signal paths after the at least one diffraction unit
- while maintaining at least one angle offset between the set beam directions generated before the at least one beam alignment unit
- or while generating at least one angle offset between the set beam directions.

According to the invention, one or more emission signals having at least two different signal paths are diffracted using at least one diffraction unit having a diffractive effect, in order to set the respective beam direction thereof.

Separate diffraction units can advantageously be arranged in at least two of the signal paths. In this manner, the beam directions in the signal paths can be set independently of one another. A separate diffraction unit can preferably be arranged in each of the signal paths.

Using the at least one beam alignment unit, the emission signals diffracted by the at least one diffraction unit are each radiated into the monitoring region.

The at least one angle offset between the set beam directions ensures that the respective set beam directions are inclined in relation to one another. A correspondingly larger aperture angle can be covered in this manner.

For reasons of interference, an emission signal diffracted at a diffraction unit propagates in a main lobe and at least one secondary lobe. In this case, the emission energy of the emission signal is allocated onto the main lobe and the secondary lobes, wherein the greater part of the emission energy is generally incident on the main lobe. By way of a suitable angle offset, the emission energies of the respective main lobes and/or secondary lobes of adjacent signal paths can add up.

Suitable arrangements can advantageously be provided in the signal paths before the at least one beam alignment unit to predetermine the at least one angle offset.

Alternatively or additionally, the at least one angle offset between the set beam directions can be predetermined using the at least one beam alignment unit.

The detection system can advantageously operate according to a light runtime method. Optical detection systems operating according to the light pulse runtime method can be embodied and referred to as Time-of-Flight (TOF), Light-Detection-and-Ranging (LiDAR) systems, Laser-Detection-and-Ranging (LaDAR) systems or the like. In this case, a runtime from the emission of an emission signal, in particular a light pulse, using the emitting device and the reception of the corresponding reflected reception signal using a receiving device is measured and a distance between the detection system and the detected object is ascertained therefrom.

The detection system can advantageously be a scanning system. A monitoring region can be scanned in this case using emission signals. For this purpose, the corresponding emission signals, in particular emission beams, can be pivoted with respect to the propagation direction thereof over the monitoring region with the aid of at least one diffraction unit.

The detection system can advantageously be a laser-based measuring system, in particular a distance measuring system. The laser-based distance measuring system can comprise at least one laser, in particular a diode laser, as a light source. In particular pulsed emission beams can be emitted as emission signals using the at least one laser. Coherent light having high energy density can be generated using a laser. Emission signals can be emitted in frequency ranges visible or non-visible to the human eye using the laser. A receiving device can accordingly comprise a detector designed for the frequency of the emitted light, in particular an angle-resolving detector. The laser-based measuring system can advantageously be a laser scanner. A monitoring region can be scanned in particular using pulsed laser beams using a laser scanner.

The invention is used in a vehicle, in particular a motor vehicle. The invention can advantageously be used in a land vehicle, in particular a passenger vehicle, a lorry, a bus, a motorcycle, or the like, an aircraft, and/or a watercraft. The invention can also be used in autonomous or at least partially autonomous vehicles.

The detection system can advantageously be connected to at least one electronic control device of the vehicle, in particular a driver assistance system and/or a chassis control and/or a driver information unit and/or a parking aid, or can be part thereof. In this manner, object data acquired using the detection system, in particular the distance, orientation, and/or relative velocity of an object in relation to the vehicle, can be transmitted to the control device and used for influencing driving functions, in particular the velocity, a braking function, a steering function, and/or an output of a notification and/or warning signal in particular for the driver.

In one advantageous embodiment, an angle offset between at least two set beam directions can correspond to a full width at half maximum of at least one of the diffracted emission signals. In this manner, a dense field of diffracted emission signals can be generated. More efficient scanning of the monitoring region can thus be performed. Moreover, in this way the emission energies of the main lobes and/or the secondary lobes of the at least two beam directions can add up.

An angle offset between at least two set beam directions can advantageously be predetermined in such a way that respective envelopes of the diffracted emission signals overlap.

An angle offset can advantageously be predetermined in dependence on a wavelength of the light generating the emission signals.

An angle offset between two set beam directions can advantageously be between approximately 15° and 25°, in particular approximately 22°. In this manner, an overall aperture angle of the field of view of the emitting device and thus of the detection system can be enlarged overall. In the case of a combination of two diffraction units, an overall aperture angle for the overall field of view of approximately 44° and more can advantageously be achieved. Using three diffraction units, an overall aperture angle of 66° and more can be achieved, and an overall aperture angle of 132° and more, in particular 154°, can be achieved using six diffraction units.

A single aperture angle, within which a beam direction can be set, in particular pivoted, in the respective signal path after at least one diffraction unit can advantageously be between approximately 15° and 25°, in particular 22°.

An angle offset between two set beam directions can advantageously be approximately in the order of magnitude which corresponds to an aperture angle for at least one of the beam directions. A better overlap of the diffracted emission signals can occur in this manner.

In a further advantageous embodiment, at least one angle offset can be implemented by means of a spatial arrangement of at least one diffraction unit and/or at least one light source. A corresponding spatial arrangement of the participating components can be installed and/or adjusted easily.

At least two light sources inclined in relation to one another can advantageously be provided, using which emission signals can be emitted, the respective beam directions of which are inclined at an angle offset in relation to one another. In this manner, the angle offset can be implemented in the beam path before the at least one diffraction unit At least two diffraction units can advantageously be provided, using which at least two beam directions inclined in relation to one another at an angle offset can be set.

In a further advantageous embodiment, at least one beam alignment unit can comprise at least one polarized beam splitter and/or at least one prism arrangement or can consist thereof. Set beam directions arriving from different directions of correspondingly linearly polarized emission signals can each be aligned in the monitoring region using a polarizing beam splitter.

Additionally or alternatively, the at least one beam alignment unit can comprise at least one different component, in particular a prism arrangement or the like. Set beam directions can be aligned using a prism arrangement.

At least one prism arrangement can advantageously comprise different prism sections, using each of which a set beam direction can be aligned. The prism sections can be designed for aligning the beam directions in consideration of the angle offset.

In a further advantageous embodiment, at least one diffraction unit can comprise an optical phased array or can consist thereof. The phase of light waves which are transmitted through a two-dimensional surface of settable surface elements or are reflected thereon can be controlled using an optical phased array (OPA). The light can be diffracted with the aid of the OPA and a beam direction of emission signals which have the form of light waves can thus be set. The diffraction with the aid of an OPA can occur with lower energy losses than a reflection on a known, in particular micromechanical, mirror.

The control of the beam direction using an OPA can be based on the Huygens-Fresnel principal. An arbitrary waveform is accordingly generated by superposition of a number of spherical secondary waves. Such secondary waves can be generated and controlled using an OPA. An amplitude and/or a phase of the spherical secondary waves can be modified in this case.

At least one diffraction unit can advantageously be embodied and/or arranged in a reflecting, transmitting, or emitting manner with respect to the at least one emission signal. Lower energy losses can be implemented in the case of a reflecting arrangement than in the case of a transmitting design. A reflecting arrangement can furthermore be implemented more compactly.

In the further advantageous embodiment, at least one emission signal incident on at least one diffraction unit can be circularly polarized. In this manner, a diffraction efficiency can be improved in particular upon use of an OPA as a diffraction unit.

In a further advantageous embodiment, at least one diffracted emission signal incident on at least one beam alignment unit can be linearly polarized. In this manner, the diffracted emission signal, in particular in the case of the use of a polarizing beam splitter as a beam alignment unit, can be aligned in the monitoring region in a more targeted manner while maintaining or generating an angle offset.

In a further advantageous embodiment, the at least one diffracted emission signal or the different diffracted emission signals, which are incident on the at least two signal paths on at least one beam alignment unit, can be polarized obliquely, in particular perpendicularly, in relation to one another. In this manner, diffracted emission signals incident from different directions on the at least one beam alignment unit can experience differing deflection in relation to the respective alignment in the monitoring region. One of the diffracted emission signals can thus be guided on a linear path through the at least one beam alignment unit and emitted into the monitoring region. The corresponding other emission signal, coming from a different direction, can be deflected accordingly using the at least one beam alignment unit and also aligned in the monitoring region.

Furthermore, the diffracted emission signals can thus be differentiated in the beam path after the at least one beam alignment unit or can achieve different effects. The corresponding emission signals can thus also be received as differently polarized reception signals and processed accordingly.

In a further advantageous embodiment, at least one component changing a polarization of the corresponding emission signal, in particular a quarter-wave plate, can be arranged in at least one respective signal path before and/or after at least one diffraction unit. The type of polarization and/or the polarization directions of the emission signal can be changed using the corresponding polarization-changing component.

A linear polarization of an emission signal can be converted into a circular polarization using a polarization-changing component in the signal path before the at least one diffraction unit. A better diffraction efficiency can be achieved using the at least one diffraction unit with the emission signals having a circular polarization.

The circular polarization of the diffracted emission signal can be converted into a linear polarization using the same or a different polarization-changing component in the signal path after the at least one diffraction unit. In this manner, the emission signal can be supplied after the polarization-changing component to a polarizing beam splitter in particular and conducted accordingly.

A linearly polarized emission signal generated using a light source can thus be deflected via a polarizing beam splitter in accordance with its polarization direction and can be emitted to the at least one diffraction unit after conversion using the polarization-changing component. On the return path, the circularly polarized diffracted emission signal can be transformed using the polarization-changing component into a linearly polarized diffracted emission signal having a linear polarization direction oblique, in particular perpendicular, to the original linear polarization direction. The linearly polarized diffracted emission signal can thus be conducted on a different path through the polarizing beam splitter than the linearly polarized emission signal originally coming from the light source.

At least one polarization-changing component can be implemented as a retardation plate, in particular a quarter-wave plate. In this manner, the polarization of emission signals can be changed using simple means.

At least one polarization-changing component, at least one optical lens, and/or at least one beam-deflecting component, in particular a prism, can be combined in a single, in particular optical element. In this manner, a material and/or installation expenditure can be reduced.

At least one light source, at least one polarizing beam splitter, at least one polarization-changing component, and at least one diffraction unit can advantageously be designed as a module. Multiple such modules can be combined with one another. At least one diffracted emission signal can be output using each module, the beam direction of which can be changed, in particular pivoted, with the aid of the respective at least one diffraction unit. The set beam directions of the emission signals of the two modules can be aligned in the monitoring region using the at least one beam alignment unit.

In a further advantageous embodiment, at least one polarizing beam splitter can be arranged in a respective signal path between the at least one light source and the at least one diffraction unit. In this manner, at least one linearly polarized emission signal coming from the light source can be conducted via the polarized beam splitter to the at least one diffraction unit. The emission signal diffracted by the at least one diffraction unit can be conducted using the at least one polarizing beam splitter on a different path into the monitoring region.

In a further advantageous embodiment, at least one beam-deflecting component, in particular at least one prism, can be arranged in at least one signal path before and/or after at least one diffraction unit and optionally before and/or after at least one polarization-changing component. A beam direction of an emission signal coming from the light source can be aligned on the at least one diffraction unit using the at least one beam-deflecting component before the at least one diffraction unit.

At least one set beam direction of a diffracted emission signal can be aligned in particular in the monitoring region using a beam-deflecting component arranged after the at least one diffraction unit.

The beam-deflecting component can be arranged both in the signal path of the incoming emission signal and also of the diffracted emission signal with respect to a reflecting diffraction unit. In this manner, using the beam-deflecting component, the at least one incoming emission signal can be aligned on the at least one diffraction unit and the emission signal diffracted by the at least one diffraction unit can be aligned in particular in the monitoring region.

In a further advantageous embodiment, at least one optical lens can be arranged in at least one signal path before and/or after at least one diffraction unit. The emission signal can be focused on an active area of the diffraction unit with the aid of an optical lens before the at least one diffraction unit. Accordingly, the emission signal can be formed accordingly using an optical lens after the at least one diffraction unit.

The at least one optical lens can be arranged both in the signal path of the incoming emission signal and also of the diffracted emission signal with respect to a reflecting diffraction unit. In this manner, using the at least one optical lens, the at least one incoming emission signal can be focused on the at least one diffraction unit and the emission signal diffracted by the at least one diffraction unit can be adapted accordingly.

Furthermore, the technical object is achieved according to the invention in the detection system in that
- at least one diffraction unit, which is settable for setting the beam directions associated with the respective signal paths, is arranged in at least two different signal paths of one emission signal or various emission signals,
- at least one beam alignment unit is arranged in the respective signal paths after the at least one diffraction unit to align the set beam directions in the at least one monitoring region
- while maintaining at least one angle offset between the set beam directions generated before the at least one beam alignment unit
- or while generating at least one angle offset between the set beam directions.

Moreover, the technical object is achieved according to the invention in the driver assistance system in that
- at least one diffraction unit, which is settable for setting the beam directions associated with the respective signal paths, is arranged in at least two different signal paths of one emission signal or various emission signals,
- at least one beam alignment unit is arranged in the respective signal paths after the at least one diffraction unit to align the set beam directions in the at least one monitoring region
- while maintaining at least one angle offset between the set beam directions generated before the at least one beam alignment unit
- or while generating at least one angle offset between the set beam directions.

Furthermore, the technical object is achieved according to the invention in the method in that
- one emission signal or various emission signals are emitted in at least two different signal paths to at least one diffraction unit,
- respective beam directions of the at least one emission signal associated with the respective signal paths are set using the at least one diffraction unit
- and the set beam directions are aligned in the at least one monitoring region,
- wherein at least one angle offset is generated before or after the at least one diffraction unit between the set beam directions.

At least one angle offset between the at least two beam directions can advantageously be predetermined in such a way that respective envelopes of the diffracted emission signals overlap. In this manner, an aperture angle of the overall field of view of the detection system for monitoring the monitoring region can be enlarged.

Moreover, the features and advantages disclosed in conjunction with the emitting device according to the invention, the detection system according to the invention, the driver assistance system according to the invention, and the method according to the invention and the respective advantageous designs thereof apply to one another and vice versa. The individual features and advantages can self-evidently be combined with one another, wherein further advantageous effects can result, which go beyond the sum of the individual effects.

BRIEF DESCRIPTION OF THE DRAWINGS

Further advantages, features, and details of the invention result from the following description, in which exemplary embodiments of the invention are explained in greater detail on the basis of the drawing. A person skilled in the art will expediently also consider the features disclosed in combination in the drawing, the description, and the claims individually and combine them to form further reasonable combinations. In the schematic figures

Identical components are provided with identical reference signs in the figures.

EMBODIMENT(S) OF THE INVENTION

Figure 1:
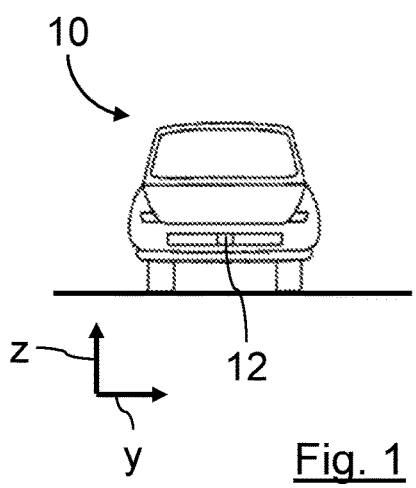
FIG. 1 shows a motor vehicle having a driver assistance system and a scanning optical detection system for monitoring a monitoring region in front of the motor vehicle in the travel direction.
Figure 2:
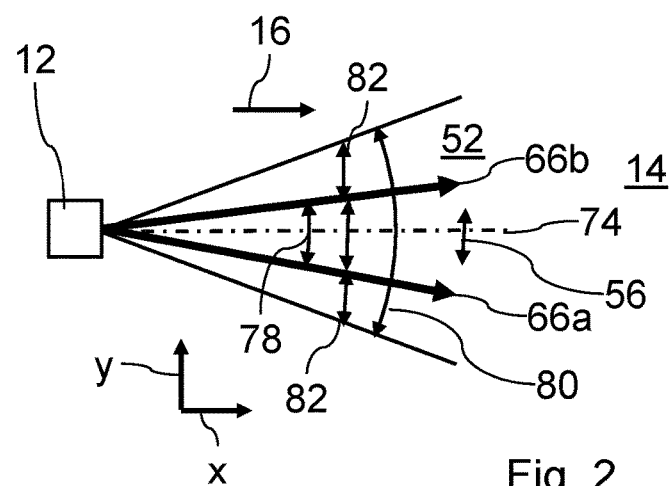
FIG. 2 shows the motor vehicle and the monitoring region from FIG. 1 in a top view.
Figure 3:
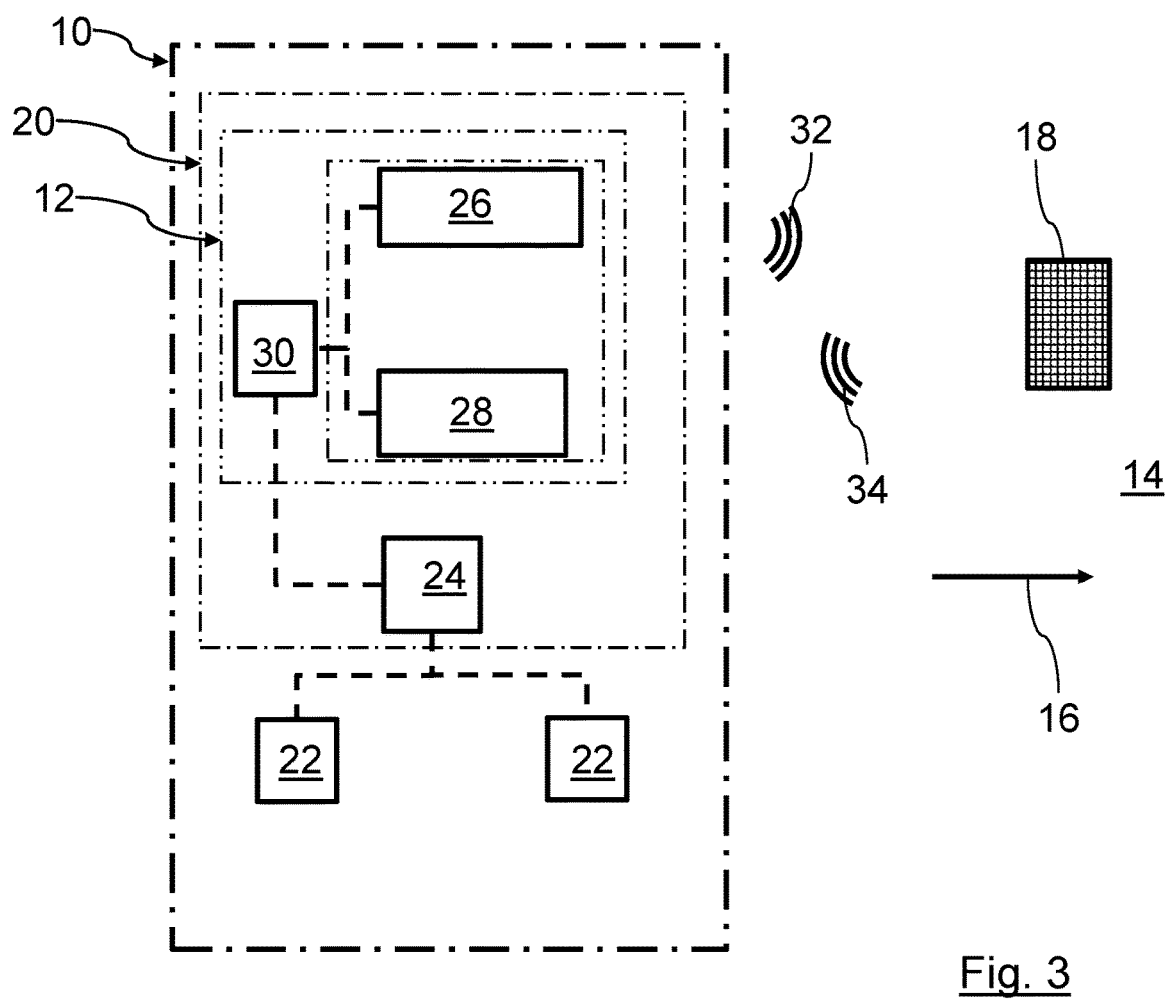
FIG. 3 shows a functional illustration of the motor vehicle having the driver assistance system and the detection system from FIG. 1.

A motor vehicle 10 in the form of a passenger vehicle is shown in a front view in FIG. 1. FIG. 2 shows the motor vehicle 10 in a top view. The motor vehicle 10 has a scanning optical detection system 12, by way of example in the form of a laser scanner. The detection system 12 is arranged by way of example in the front bumper of the motor vehicle 10. A monitoring region 14 indicated by way of example in FIGS. 2 and 3 in front of the motor vehicle 10 in the travel direction 16 can be monitored for objects 18 using the detection system 12. The detection system 12 can also be arranged at another point on the motor vehicle 10 and can be aligned differently. The objects 18 can be, for example, other vehicles, persons, obstacles, roadway irregularities, for example, potholes or rocks, roadway boundaries, or the like. An object 18 is indicated by way of example as a checked rectangle in FIG. 3. FIG. 3 is otherwise merely a functional diagram of several components of the motor vehicle 10 and the detection system 12, which is not used for spatial orientation.

The detection system 12 operates according to a light pulse runtime method. For example, a distance, a direction, and a velocity of the object 18 in relation to the motor vehicle 10 can be ascertained using the detection system 12.

The detection system 12 is part of a driver assistance system 20 or can be connected thereto. A driver of the motor vehicle 10 can be assisted, for example, using the driver assistance system 20. For example, the motor vehicle 10 can drive or park at least partially autonomously with the aid of the driver assistance system 20. Driving functions of the motor vehicle 10, for example, an engine control, a brake function, or a steering function can be influenced or notifications or warning signals can be output using the driver assistance system 20. For this purpose, the driver assistance system 20 is connected in a regulating and/or controlling manner to functional units 22. Two functional units 22 are illustrated by way of example in FIG. 3. The functional units 22 can be, for example, an engine control system, a braking system, a steering system, a chassis control, or a signal output system.

The driver assistance system 20 comprises an electronic control unit 24, using which corresponding electronic control and regulating signals can be transmitted to the functional units 22 and/or received therefrom and processed.

The detection system 12 comprises an emitting device 26, a receiving device 28, and an electronic control and analysis unit 30. Pulsed optical emission signals 32 can be emitted into the monitoring region 14 using the emitting device 26. The emission signals 32 are reflected at the object 18 and returned as corresponding pulsed optical reception signals 34 to the detection system 12. The distance of the object 16 is ascertained from the light runtime, i.e., from the time between the sending of the emission signal 32 and the reception of the corresponding reception signal 34, using the electronic control and analysis unit 30.

The control and analysis unit 30 has a signalling connection to the control unit 24. Driving functions of the motor vehicle 10 can be controlled/regulated using the control unit 24 in dependence on items of object information of the detection system 12. It is not essential to the invention whether electrical control and/or analysis devices, for example, the control unit 24, the control and analysis unit 30, an engine control unit of the motor vehicle 10, or the like are integrated into one or more components or component groups or are implemented at least partially as decentralized components or component groups.

Figure 4:
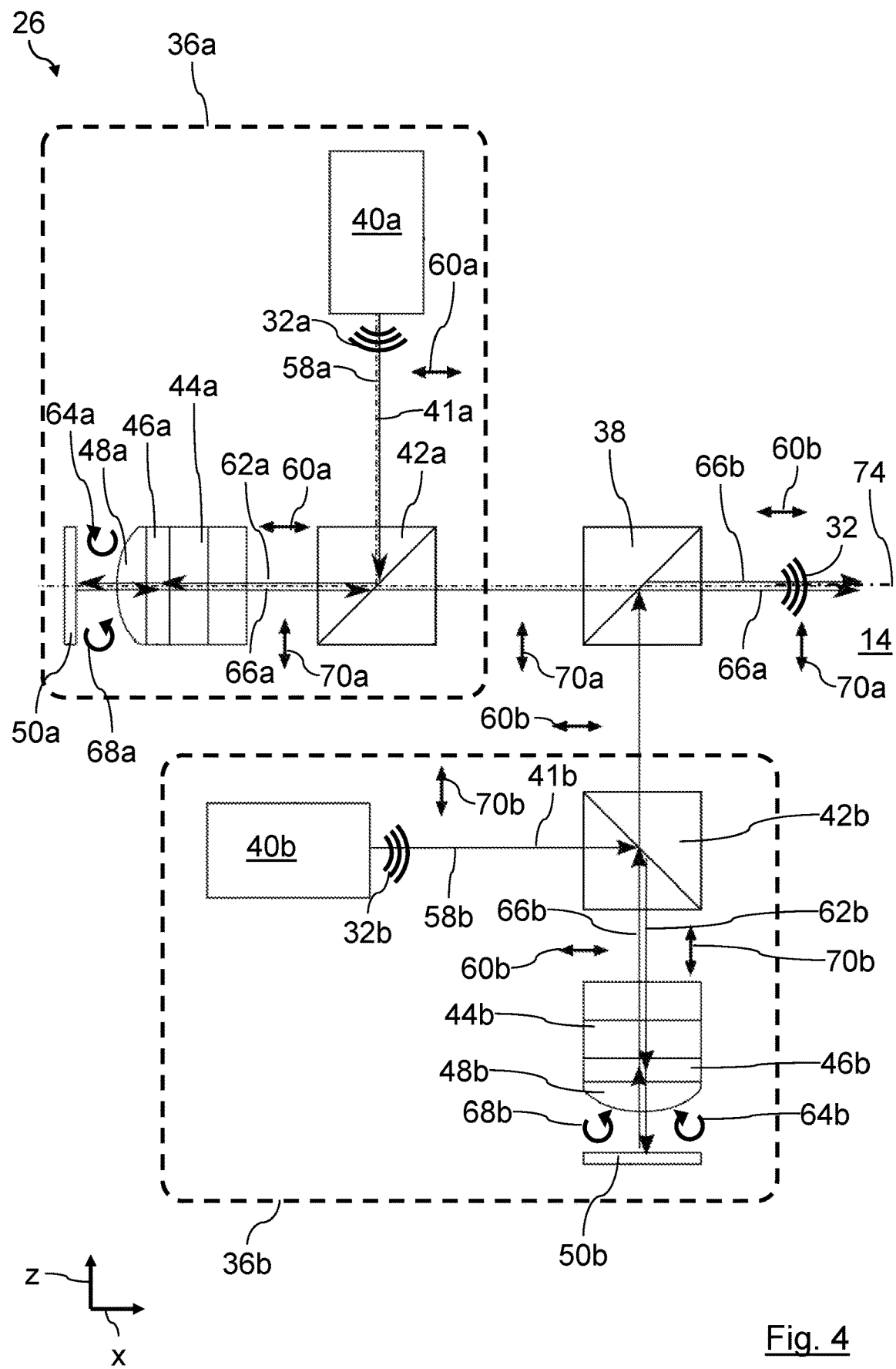
FIG. 4 shows an emitting device of the detection system from FIGS. 1 to 3 according to a first exemplary embodiment.

The emitting device 26 according to a first exemplary embodiment is schematically illustrated in FIG. 4. For the purpose of simpler orientation, respective coordinate axes of a Cartesian x-y-z coordinate system are shown in FIGS. 1, 2, and 4.

The emitting device 26 comprises two modules 36*a* and 36*b* and a beam alignment unit 38 in the form of a polarizing beam splitter. A corresponding first emission signal 32*a* is emitted using the first module 36*a*. A corresponding second emission signal 32*b* is emitted using the second module 36*b*. The emission signals 32*a* and 32*b* are adapted to one another and thus overall form the emission signal 32 emitted using the emitting device 26.

The first module 36*a* comprises a light source 40*a* in the form of a laser. Emission signals 32*a* are emitted using the light source 40*a*. A polarizing beam splitter 42*b*, a prism arrangement 44*a*, a polarization-changing component in the form of a quarter-wave plate 46*a*, an optical lens 48*a*, and a diffraction unit having a diffractive effect, for example, in the form of an optical phased array (OPA) 50*a*, are arranged in a signal path 41*a* of the emission signals 32*a*. Correspondingly, a laser light source 40*b* of the second module 36*b*, a polarizing beam splitter 42*b*, a prism arrangement 44*b*, a quarter-wave plate 46*b*, an optical lens 48*b*, and an OPA 50*b* are arranged in a signal path 41*b* of the emission signals 32*b*. The signal paths 41*a* and 41*b* are the paths which the corresponding emission signals 32*a* and 32*b* take from the respective light source 40*a* and 40*b* up to the monitoring region 14.

Firstly the first module 36*a* will be described in greater detail hereafter. The laser 40*a* is located by way of example above a pivot plane 52. The emission signal 32*a* emitted using the laser 40*a* in the form of a laser beam is pivoted back and forth in a pivot direction 56 to optically scan the monitoring region 14 in the pivot plane 52 during the operation of the detection system 12 by changing its beam direction 66*a*, as indicated in FIG. 2. The pivot plane 52 extends horizontally by way of example, in parallel to the x-y plane. An imaginary main axis 74 of the emitting device 26 extends in the pivot plane 52. The main axis 74 extends in parallel to the x axis.

The light source 40*a* is aligned in such a way that the pulsed, linearly polarized laser beam generated thereby is oriented having a beam direction 58*a* perpendicular to the pivot plane 52 by way of example. The polarization direction 60*a* of the emission signal 32*a* is firstly horizontally aligned by way of example. The horizontal polarization direction 60*a* is indicated in FIG. 4 by a double arrow. The horizontal polarization direction 60*a* is aligned by way of example in parallel to the main axis 74 of the emitting device 26.

The emission signal 32*a* having the beam direction 58*a* is incident on an input side of the beam splitter 42*a* and is deflected because of its horizontal polarization direction 60*a* by 90° away from the monitoring region 14.

The prism arrangement 44*a*, the quarter-wave plate 46*a*, and the OPA 50*a* are arranged in succession in the beam path 41*a* of the deflected emission signal 32*a* having the beam direction 62*a*.

The deflected emission signal 32*a* having the beam direction 62*a* traverses the prism arrangement 44*a* and passes the quarter-wave plate 46*a*. The horizontal polarization direction 60*a* is transformed using the quarter-wave plate 46*a*, for example, into a right-circular polarization direction 64*a*, which is indicated in FIG. 4 by a corresponding circular curved arrow. The emission signal 32*a* having the right-circular polarization direction 64*a* is focused using the lens 48*a* on the OPA 50*a*.

The OPA 50*a* is operated in reflection by way of example. A beam direction 54*a* of the emission signal 32*a* diffracted by the OPA 50*a* can be set in a known manner using the OPA 50*a* by corresponding control of the phase of the emission signal 32*a*, which has the form of a light wave. The emission signal 32*a* having the set beam direction 66*a* is pivoted back and forth in the pivot plane 52 by corresponding activation of the OPA 50*a*.

The reflected emission signal 32*a* is returned having the correspondingly set beam direction 66*a* to the lens 48*a*. The beam direction 66*a* is referred to hereafter for easier differentiability as the "set beam direction 66*a*". Upon the diffraction at the OPA 50a, the polarization direction is reversed, so that the emission signal 32a having the set beam direction 66a has a left-circular polarization direction 68a. The left-circular polarization direction 68a is indicated by a corresponding circular curved arrow in FIG. 4.

The emission signal 32a having the set beam direction 66a passes through the lens 48a to the quarter-wave plate 46a. The left-circular polarization direction 68a of the emission signal 32a is converted using the quarter-wave plate 46a into a vertical linear polarization direction 70a. The vertical polarization direction 70a is aligned perpendicularly to the horizontal polarization direction 60a, in parallel to the z axis.

The emission signal 32a having the set beam direction 66a and the vertical polarization direction 70a reaches the polarizing beam splitter 42a. The polarizing beam splitter 42a is transmissive on linear paths from the corresponding entry side, the first one by way of example, for the emission signal 32a having the set beam direction 66a and the vertical polarization direction 70a.

The emission signal 32a having the set beam direction 66a and the vertical polarization direction 70a leaves the first module 36a and reaches the beam alignment unit 38 in the form of a further polarizing beam splitter. The beam alignment unit 38 is arranged in the signal path 41a of the emission signal 32a of the first module 36a. Using the beam alignment unit 38, the emission signal 32a having the set beam direction 66a and the vertical polarization direction 70a is aligned on linear paths in the monitoring region 14.

Figure 5:
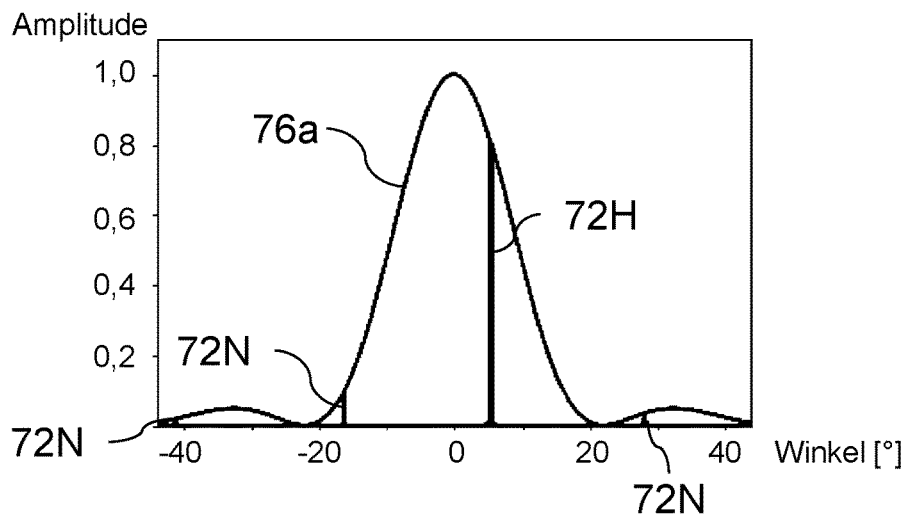
FIG. 5 shows an amplitude-angle diagram of an emission signal laser beam generated using a module of the emitting device from FIG. 4.

A schematic amplitude-angle diagram of a set emission signal 32a diffracted by way of example at the OPA 50a is shown in FIG. 5. The incoming emission signal 32a having the beam direction 58a is diffracted at settable diffraction elements using the OPA 50a in such a way that a part of the emission energy of the emission signal 32a is emitted in a main lobe 72H and a part of the energy of the emission signal 32a is emitted in secondary lobes 72N into the monitoring region 14. The main lobe 72H and the secondary lobes 72N are enclosed by an envelope 76a.

The modules 36a and 36b are identical with respect to the structure and the functionality thereof. The second module 36b is pivoted by 90° downward away from the light source 40a in relation to the first module 36a with respect to the beam alignment unit 38.

The linear polarization direction 70b of the emission signal 32b having the beam direction 58b exiting from the second light source 40b is accordingly aligned perpendicularly in relation to the horizontal polarization direction 60a of the corresponding emission signal 32a having the beam direction 58a of the first light source 40a, i.e., vertically. Furthermore, the polarization direction 60b of the diffracted emission signal 32b having the set beam direction 66b of the second module 36b is aligned perpendicularly to the vertical polarization direction 70a of the diffracted emission signal 32a having the set beam directions 66a of the first module 36a, i.e., horizontally. Upon the diffraction at the OPA 50b, the polarization direction is reversed, so that the emission signal 32b having the set beam direction 66b has a left-circular polarization direction 68b. The left-circular polarization direction 68b is indicated by a corresponding circular curved arrow in FIG. 4.

The prism arrangement 44b, the quarter-wave plate 46b, and the OPA 50b are arranged in succession in the beam path 41b of the deflected emission signal 32b having the beam direction 62b.

The beam alignment unit 38 is arranged in the signal path 41b of the emission signals 32b of the second module 36b. The diffracted emission signal 32b having the set signal direction 66b of the second module 36b is conducted onto the second input side of the beam alignment unit 38a and is deflected using it in dependence on the polarization, while maintaining the horizontal polarization direction 60b, by 90° away from the first module 36a in the pivot plane 52 and thus aligned in the monitoring region 14.

The first module 36a, the second module 36b, and the beam alignment unit 38 are arranged in such a way that a set beam direction 66a of the diffracted emission signal 32a of the first module 36a and a set beam direction 66b of the diffracted emission signal 32b of the second module 36b have an angle offset 78 as indicated in FIG. 2 in the pivot plane 52. The angle offset 78 is selected in such a way that the main lobes 72H of the diffracted emission signal 32a and the main lobe 72H of the diffracted emission signal 32b overlap and the emission energies are thus accordingly added. For example, the angle offset 78 corresponds to a full width at half maximum of the envelope 76a of the diffracted emission signal 32a of the first module 36a. The full width at half maximum of the envelope 76a preferably corresponds to the full width at half maximum of the envelope 76b of the diffracted emission signal 32b of the second module 36b. The angle offset 78 in the exemplary embodiment shown is 22°.

Furthermore, an overall aperture angle 80 indicated in FIG. 2 of an overall field of view of the detection system 12 in the pivot plane 52 is enlarged overall by the angle offset 78. The overall field of view of the detection system 12 is composed of the superposition of the individual fields of view of the modules 36a and 36b. Accordingly, the overall aperture angle 80 is formed from the individual aperture angles 82 of the modules 36a and 36b. The individual fields of view are defined by the individual aperture angles 82, within which the set beam directions 66a and 66b are each pivoted back and forth.

Because the diffracted emission signal 32a of the first module 36a and the diffracted emission signal 32b of the second module 36b are differently linearly polarized, the corresponding reception signals are differentiable from one another on the receiver side.

Figure 6:
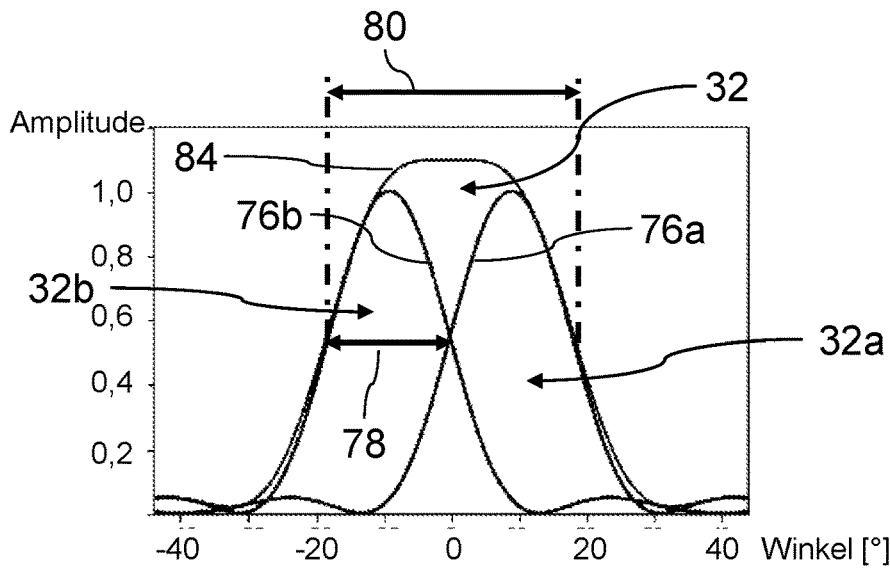
FIG. 6 shows an amplitude-angle diagram of two superimposed emission signal laser beams, which are generated using two modules of the emitting device from FIG. 4.

The diffracted emission signals 32a and 32b are shown by way of example in FIG. 6 in a phase of the pivoting of the set beam directions 66a of the first module 36a and 66b of the second module 36b in an amplitude-angle diagram. In this pivot phase, the beam direction 66a of the diffracted emission signal 32a is inclined by an angle of 11° in relation to the main axis 74, which is at 0°. The beam direction 66b of the diffracted emission signal 32b is inclined by an angle of −11° in relation to the main axis 74. The envelope 76a of the diffracted emission signal 32a of the first module 36a and the envelope 76b of the diffracted emission signal 32b of the second module 36b are enclosed by an overall envelope 84 of the overall emission signal 32. In dependence on the wavelength λ of the utilized emission signals 32a and 32b, the modules 36a and 36b each have an individual aperture angle 82 of approximately 22°. Due to the superposition of the diffracted emission signals 32a and 32b of the two modules 36a and 36b, as indicated in FIG. 6, an overall aperture angle 80 of the overall emission signal 32 of 44° is achieved by way of example.

Figure 7:
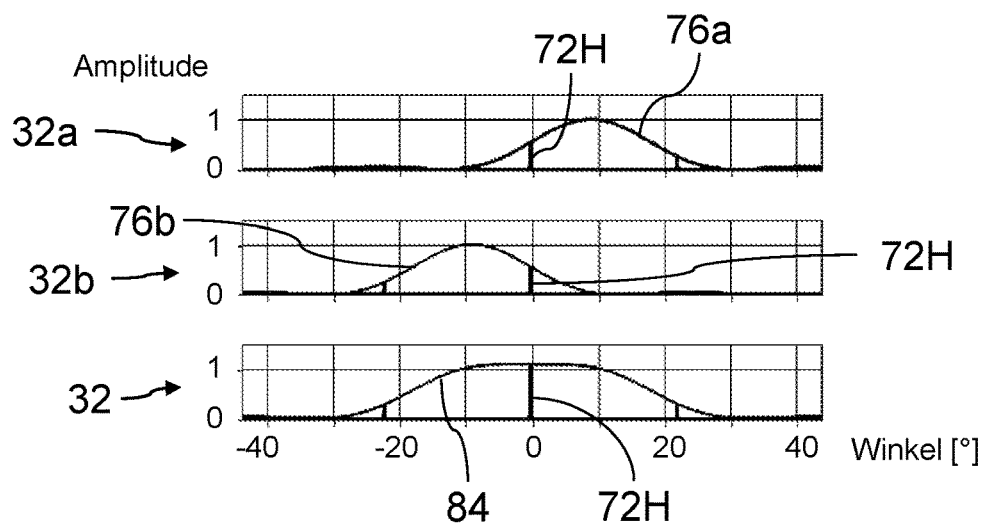
FIG. 7 shows amplitude-angle diagrams of the individual emission signal laser beams and the resulting emission signal laser beam from FIG. 6.

FIG. 7 shows, in the pivot phase corresponding to FIG. 6 in an amplitude-angle diagram, the diffracted emission signal 32a of the first module 36a at the top, the diffracted emission signal 32b of the second module 36b in the middle, and the overall emission signal 32 as the superposition of the two diffracted emission signals 32a and 32b at the bottom.

In this exemplary embodiment, because of the specially selected angle offset 78, the main lobe 72H of the diffracted emission signal 32a and the main lobe 72H of the diffracted emission signal 32b are emitted at the same angle with respect to the main axis 74, by way of example at an angle of 0°, into the monitoring region 14. As a result of the superposition of the diffracted emission signals 32a and 32b, the signal energy of the overall emission signal 32 is doubled at said angle.

Figure 8:
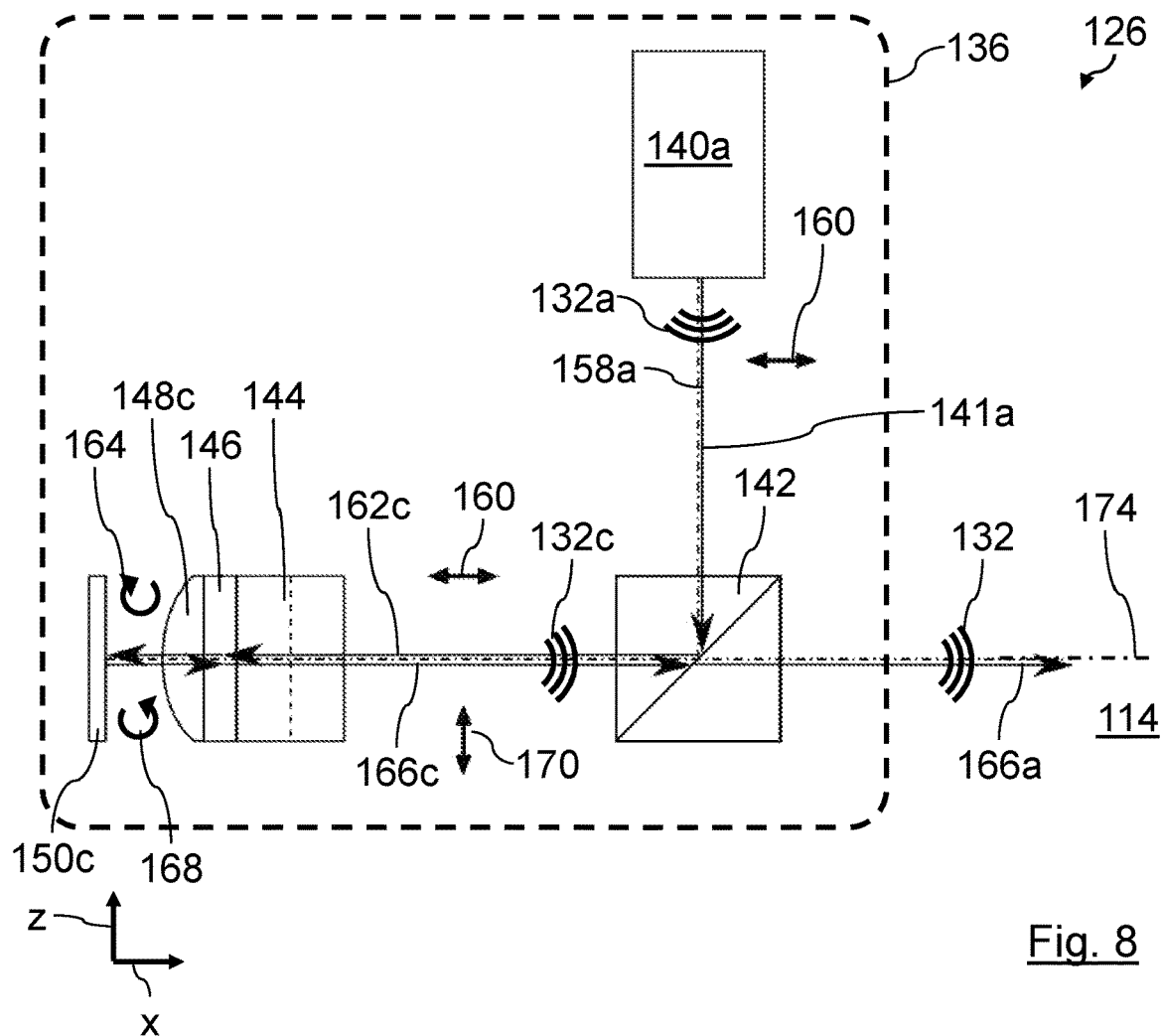
FIG. 8 shows an emitting device according to a second exemplary embodiment in a side view, which is similar to the emitting device from FIG. 4 and can be used for the detection system from FIGS. 1 to 3.
Figure 9:
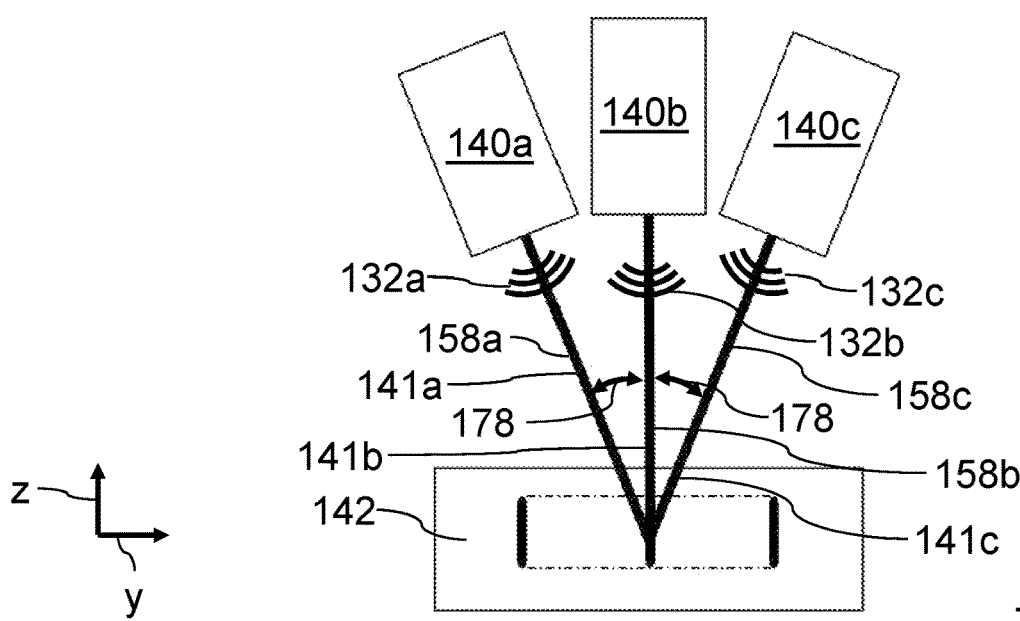
FIG. 9 shows the emitting device from FIG. 8 in a top view.
Figure 10:
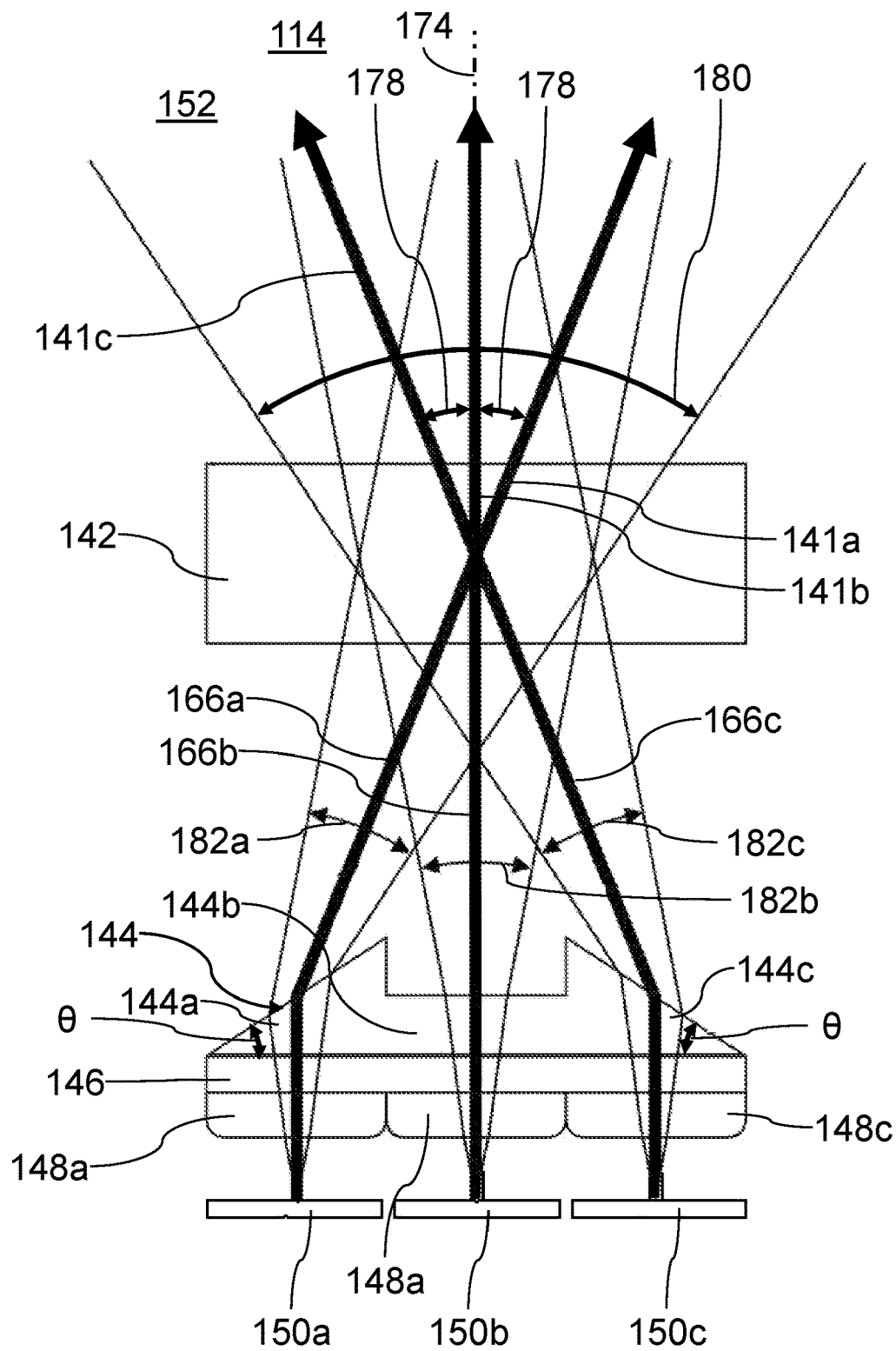
FIG. 10 shows the emitting device from FIGS. 8 and 9 in cross section.

An emitting device 126 consisting of a module 136 for a detection system 12 according to a second exemplary embodiment is shown in FIGS. 8 to 10. The elements which are similar to those of the first exemplary embodiment from FIGS. 1 to 7 are provided with the same reference signs plus 100. In contrast to the first exemplary embodiment from FIGS. 1 to 7, the module 136 comprises three light sources 140a, 140b, and 140c and three corresponding OPAs 150a, 150b, and 150c.

The light sources 140a, 140b, and 140c are each embodied as a laser. The light sources 140a, 140b, and 140c are located by way of example, as shown in FIG. 8, above the pivot plane 52 and the main axis 174 of the emitting device 126. Respective emission signals 132a, 132b, and 132c in the form of pulsed, horizontally linearly polarized laser beams are generated using the light sources 140a, 140b, and 140c and emitted in respective beam directions 158a, 158b, and 158c. The horizontal polarization direction 160 is aligned in parallel to the main axis 174 of the emitting device 126 and is indicated by double arrows in FIG. 8.

The light sources 140a, 140b, and 140c are aligned and arranged in such a way that the respective beam directions 158a, 158b, and 158c are located in a shared plane viewed perpendicularly to the main axis 174. Viewed in the direction of the main axis 174, the respective adjacent beam directions 158a, 158b, and 158c are oriented at an angle offset 178 on a polarizing beam splitter 142 in such a way that they intersect in a common intersection point. As a whole, three different signal paths 141a, 141b, and 141c for the corresponding emission signals 132a, 132b, and 132c are implemented by the corresponding spatial alignment of the light sources 140a, 140b, and 140c.

The angle offset 178 is maintained on the signal paths 141a, 141b, and 141c of the emission signals 132a, 132b, and 132c from the respective light sources 140a, 140b, and 140c up into the monitoring region 114. The angle offset 178 is approximately 22° by way of example. The angle offset 178 is achieved by the arrangement of the light sources 140a, 140b, and 140c in the corresponding inclination in a mechanical manner.

The beam directions 158a, 158b, and 158c are deflected while maintaining the angle offset 178 thereof using the beam splitter 142 by 90° in parallel to the main axis 174 away from the monitoring region 114 toward a prism arrangement 144. The deflected beam signals 158a, 158b, and 158c have beam directions 162a, 162b, and 162c.

The prism arrangement 144 is shown in detail in FIG. 10. The prism arrangement 144 comprises two outer prism sections 144a and 144c and one inner prism section 144b. The flat side of the prism arrangement 144 facing away from the beam splitter 142 extends over all three prism sections 144a, 144b, and 144c and extends perpendicularly to the main axis 174. The outer prism sections 144a and 144c are designed and arranged symmetrically. The flat sides of the outer prism sections 144a and 144c, which face toward the beam splitter 142, each extend perpendicularly to the x-y plane and inclined at a prism angle θ in relation to the side of the prism arrangement 144 facing away from the beam splitter 142. The flat side of the inner prism section 144b facing toward the beam splitter 142 extends in parallel to the flat side facing away from the beam splitter 142.

The two outer emission signals 132a and 132c having the beam directions 158a and 158c are each incident on one of the outer prism sections 144a and 144c. The middle emission signal 132b having the beam direction 158b is incident on the inner prism section 144b.

Because of the inclined input sides of the two outer prism sections 144a and 144c, the emission signals 132a and 132c having the beam directions 158a and 158c are each diffracted in such a way that the beam directions 158a and 158c extend in parallel to one another after the prism arrangement 144 and are oriented on the corresponding OPAs 150a and 150c.

Figure 11:
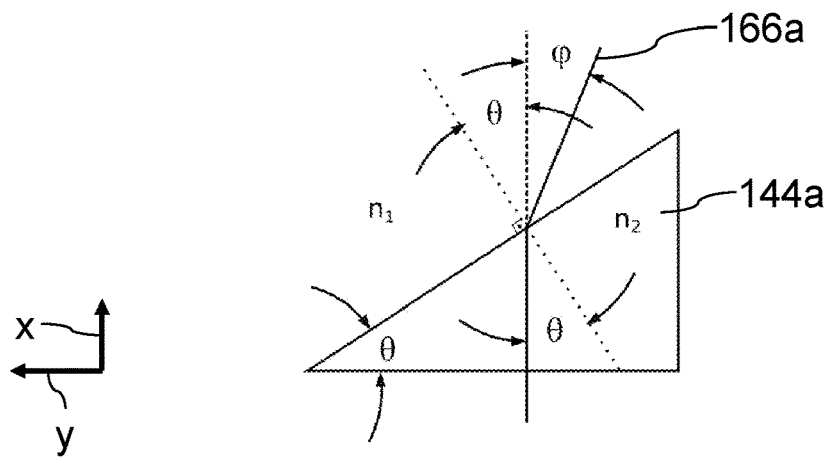
FIG. 11 shows a detail view of a prism arrangement of the emitting device from FIGS. 8 to 10.

A detail view of the left prism section 144a in FIG. 10 is shown in FIG. 11. According to Snell's law of refraction, the following relationship applies between the prism angle θ and an offset angle φ:

$$n_2 \sin(\theta) = n_1 \sin(\varphi+\theta)$$

In this case, the offset angle φ corresponds to the angle offset 178, $n_1$ is the index of refraction for air, which is approximately 1, and $n_2$ is the index of refraction of the prism material, for example, 1.5. A prism angle θ of approximately 33° accordingly results for the offset angle φ of 22°.

The emission signals 132a, 132b and 132c each traverse, after the prism arrangement 144 on the respective signal paths 141a, 141b, and 141c thereof, a corresponding quarter-wave plate 146, using which the horizontal polarization direction 160 is transformed in a known manner into right-circular polarization directions 164. The right-circularly polarized emission signals 132a, 132b and 132c are focused by means of a respective optical lens 148a, 148b, and 148c on the respective OPA 150a, 150b, and 150c.

The OPAs 150a, 150b, and 150c are located in a common plane, which extends perpendicularly to the main axis 174. Using the OPAs 150a, 150b, and 150c, the emission signals 132a, 132b, and 132c are controlled similarly to the first exemplary embodiment and the beam directions 158a, 158b, and 158c thereof are pivoted back and forth in the pivot plane 152. The pivot plane 152 is located in the plane of the drawing by way of example in FIG. 10. Moreover, the right-circular polarization directions 164 are transformed into left-circular polarization directions 168 using the OPAs 150a, 150b, and 150c, similarly to the first exemplary embodiment.

The diffracted emission signals 132a, 132b, and 132c having the set beam directions 166a, 166b, and 166c thereof, which are identified by way of example in FIG. 10, while maintaining the angle offset 178 on separate signal paths 141a, 141b, and 141c, traverse the corresponding lenses 148a, 148b, 148c and the quarter-wave plate 146. The left-circular polarization directions 168 are converted into vertical-linear polarization directions 170 using the quarter-wave plate 146.

Subsequently, the diffracted emission signals 132a, 132b, and 132c having the set beam directions 166a, 166b, and 166c thereof traverse the respective corresponding prism sections 144a, 144b, and 144c and are aligned toward the monitoring region 114 while maintaining the angle offset 178. The prism arrangement 144 thus acts as a beam alignment unit for the set beam directions 166a, 166b, and 166c. The control of the OPAs 150a, 150b, and 150c causes the controlled beam directions 166a, 166b, and 166c to each be pivoted within a respective individual field of view having a corresponding individual aperture angle 182a, 182b, and 182c.

The diffracted emission signals 132a, 132b, and 132c having vertical polarization direction 170 traverse the beam splitter 142 on linear paths while maintaining the angle offset 178 in the pivot plane 52. After the beam splitter 142, an overall field of view having an overall aperture angle 180 for the detection system 112, which is significantly larger than the individual fields of view having the individual aperture angles 182a, 182b, and 182c, results because of the superposition of the individual fields of view of the individual diffracted emission signals 132a, 132b, and 132c.

Figure 12:
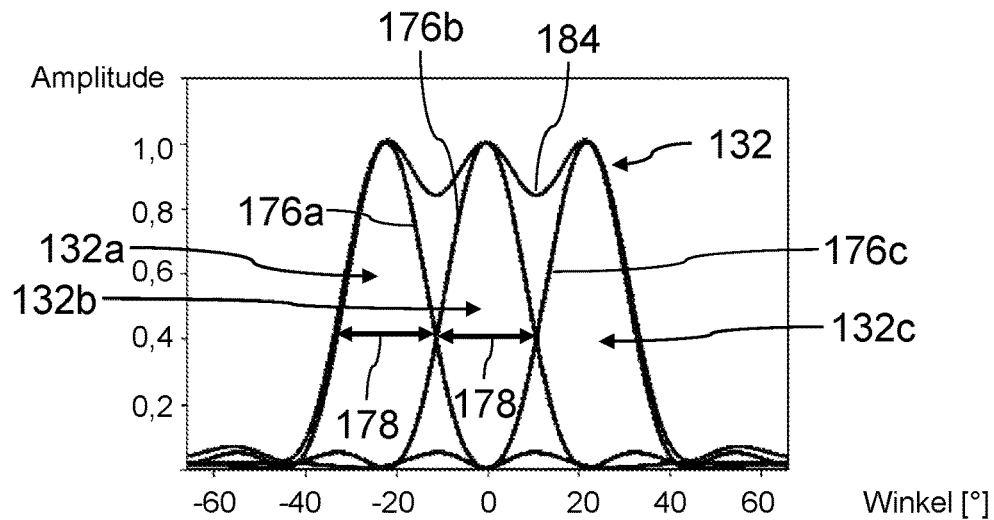
FIG. 12 shows an amplitude-angle diagram of three superimposed emission signal laser beams, which were generated using the emitting device from FIG. 4.

An amplitude-angle diagram having the envelopes 176a, 176b, and 176c of the diffracted emission signals 132a, 132b, and 132c is shown in FIG. 12. It can be seen from FIG. 12 that the beam directions 166a and 166b and the beam directions 166b and 166c are respectively inclined in relation to one another by the angle offset 178 of 22°, which corresponds to the full width at half maximum of the respective envelopes 176a, 176b, and 176c. Due to the superposition of the envelopes 176a to 176c of the diffracted emission signals 132a, 132b, and 132c, an overall envelope 184 results for the overall emission signal 132 emitted into the monitoring region 14.

Figure 13:
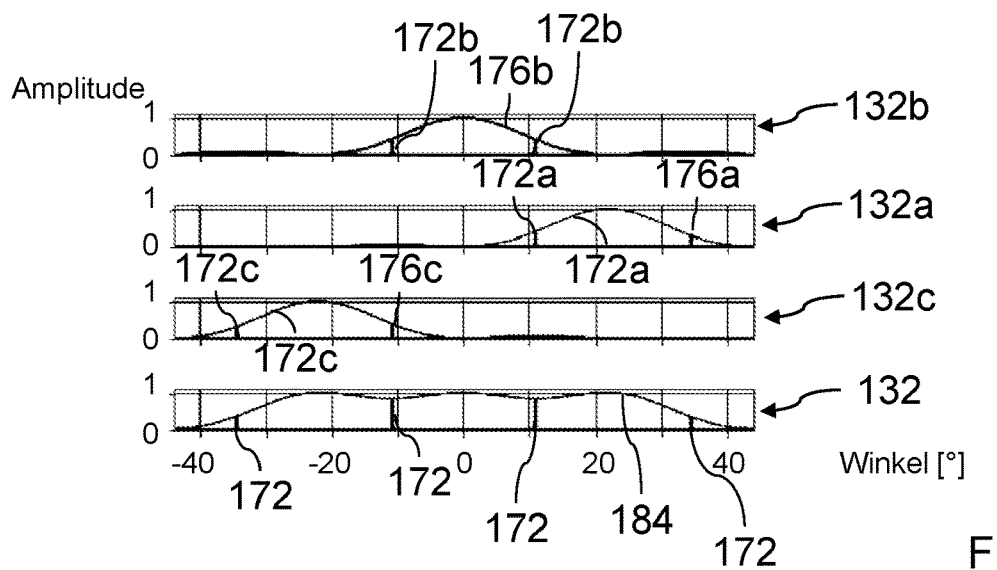
FIG. 13 shows amplitude-angle diagrams of the individual emission signal laser beams and the resulting emission signal laser beam from FIG. 12.

FIG. 13 shows, in corresponding amplitude-angle diagrams in an exemplary pivot phase of the emitting device 26, the emission signal 132b generated using the second light source 140b and diffracted using the second OPA 150b at the top, the emission signal 132a generated using the first light source 140a and diffracted using the first OPA 150a at the second position, the emission signal 132c generated using the third light source 140b and diffracted using the third OPA 150c at the third position, and the overall emission signal 132 as a superposition of the three diffracted emission signals 132a, 132b, and 132c at the bottom. In this exemplary embodiment, because of the specially selected angle offset 178, one of the lobes 172b of the second diffracted emission signal 132b and one of the lobes 172a of the first diffracted emission signal 132a are emitted at the same angle with respect to the main axis 174, for example, at the angle of 11°, into the monitoring region 114. Accordingly, the other lobe 172b of the second diffracted emission signal 132b and one of the lobes 172c of the third diffracted emission signal 132c are emitted at the same angle with respect to the main axis 174, for example, at the angle of −11°, into the monitoring region 114. As a result of the superposition of the diffracted emission signals 132a and 132b or 132b and 132c, respectively, the signal energy of the overall emission signal 132 is doubled at said angles.

Figure 14:
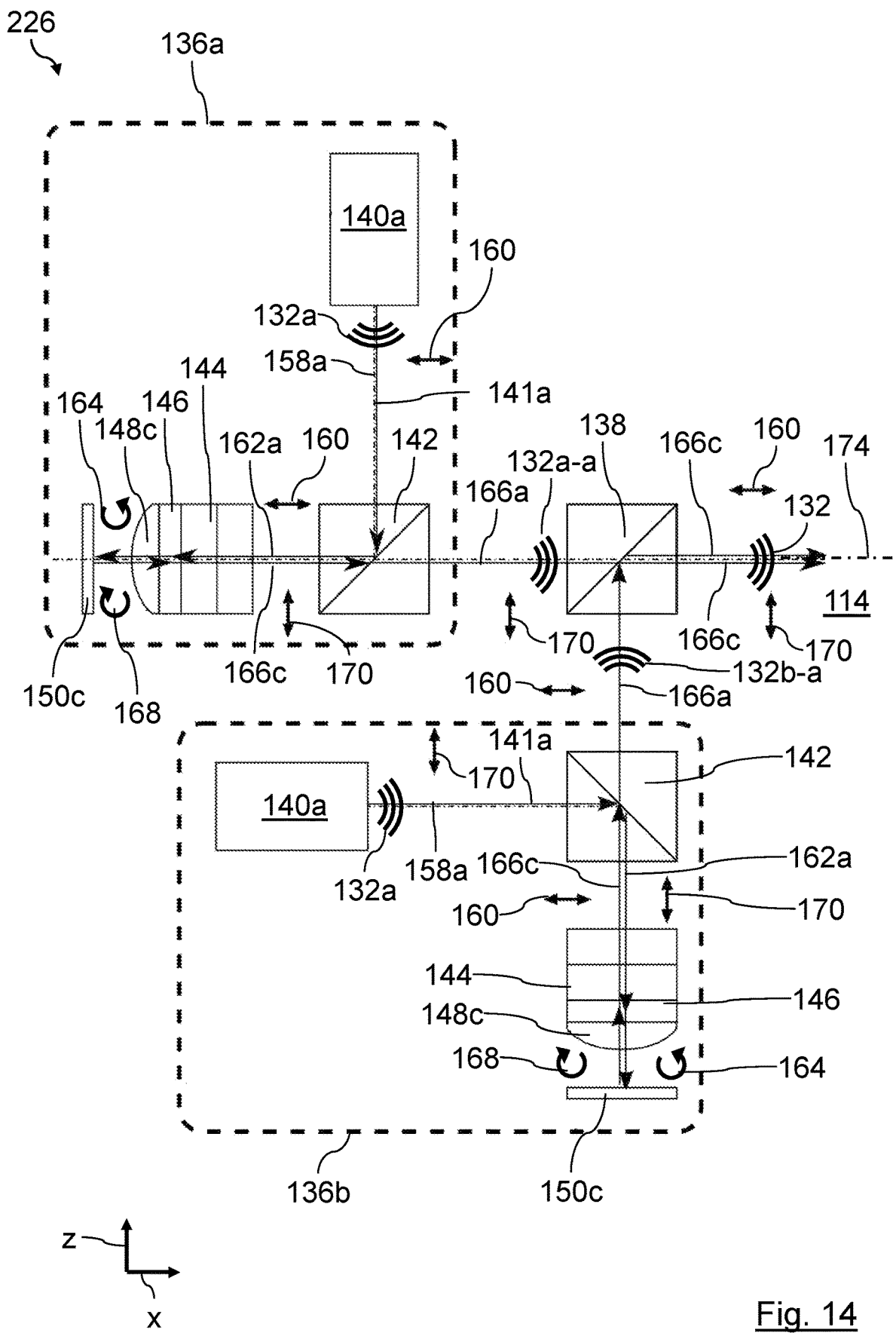
FIG. 14 shows an emitting device according to a third exemplary embodiment, which is similar to the emitting devices from FIGS. 4 and 8 to 10 and can be used for the detection system from FIGS. 1 to 3.

An emitting device 226 according to a third exemplary embodiment is shown in FIG. 14. The emitting device 226 according to the third exemplary embodiment is constructed similarly to the emitting device 26 according to the first exemplary embodiment from FIGS. 1 to 7, with the difference that instead of the two modules 36a and 36b, two modules 136a and 136b are used, which correspond to the module 136 of the second exemplary embodiment from FIGS. 8 to 13. A total of six separate signal paths can be implemented using the emitting device 226, of which in each case only the signal path 141a is identified in FIG. 14 by way of example for each module 136a and 136b.

Using the polarizing beam splitter 138, the diffracted vertically polarized emission signals 132a-a, 132a-b, and 132a-c coming from the first module 136a having the three set beam directions, of which only the beam direction 166a is shown in FIG. 14, are aligned on three separate signal paths, of which only the signal path 141a is shown in FIG. 14, in the pivot plane 152 on linear paths while maintaining the vertical polarization direction 170 thereof in the monitoring region 114. The diffracted horizontally polarized emission signals 132b-a, 132b-b, and 132b-c coming from the second module 136b having the three set beam directions, of which only the beam direction 166a is shown in FIG. 14, are deflected by 90° in the pivot plane 152 and also aligned on three separate signal paths 141b in the monitoring region 114, wherein they maintain the horizontal polarization direction 170 thereof.

Figure 15:
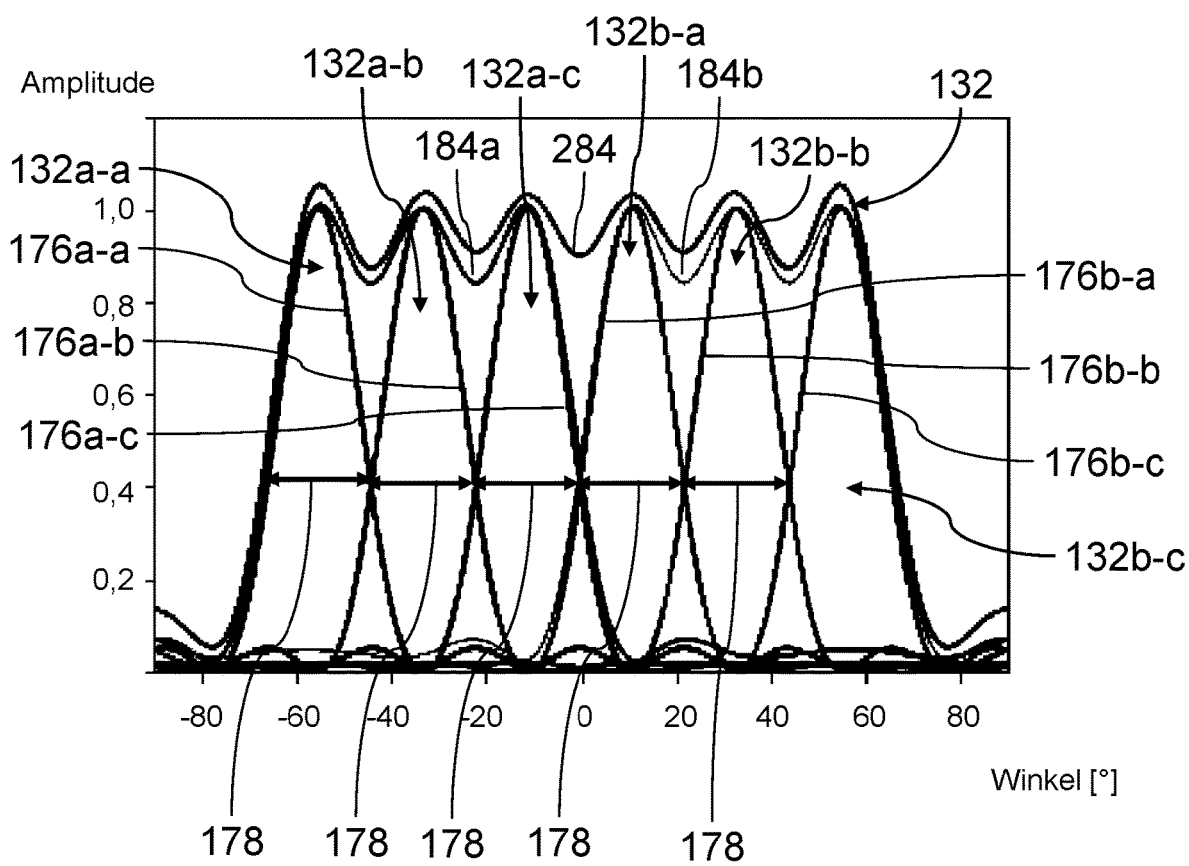
FIG. 15 shows an amplitude-angle diagram of six superimposed emission signal laser beams, which were generated using two modules of the emitting device from FIG. 14.

An amplitude-angle diagram having the envelopes 176a-a, 176a-b, and 176a-c of the diffracted emission signals 132a-a, 132a-b, and 132a-c of the first module 136a and the envelopes 176b-a, 176b-b, and 176c-c of the diffracted emission signals 132b-a, 132b-b, and 132b-c of the second module 136b is shown in FIG. 15. The respective adjacent ones of the diffracted emission signals 132a-a, 132a-b, 132a-c, 132b-a, 132b-b, and 132b-c are inclined in relation to one another by the angle offset 178 of 22°, which corresponds to the full width at half maximum of the respective envelopes 176a-a, 176a-b, 176a-c, 176b-a, 176b-b, 176c-c. The set beam directions 166a-a, 166a-b, and 166a-c of the first module 136a are thus inclined in relation to one another by the angle offset 178 as in the second exemplary embodiment from FIGS. 8 to 13. The set beam directions 166b-a, 166b-b, and 166b-c of the second module 136a are also inclined in relation to one another by the angle offset 178. The set of the beam directions 166b-a, 166b-b, and 166b-c of the second module 136a is inclined by 66° in relation to the set of the beam directions 166a-a, 166a-b, and 166a-c of the first module 136a. In this case, the beam direction 166a-c of the first module 136a and the beam direction 166b-a of the second module 136b, which are adjacent, are also inclined in relation to one another by the angle offset 178. The beam directions 166a-a, 166a-b, 166a-c, 166b-a, 166b-b, and 166b-c of both modules 136a and 136b encompass an angle of approximately 154° as a whole.

Due to the superposition of the envelopes 176a-a, 176a-b, 176a-c, 176b-a, 176b-b, 176c-c of all diffracted emission signals 132a-a, 132a-b, 132a-c, 132b-a, 132b-b, and 132b-c, an overall envelope 284 results for the overall emission signal 132 emitted into the monitoring region 114.

For all described exemplary embodiments, the quarter-wave plates 46; 146, the prism arrangements 44; 144, and/or the optical lenses 48; 148 can each be combined into one optical element, for example.

The invention claimed is:

1. An emitting device for a scanning optical detection system of a vehicle for monitoring at least one monitoring region for objects, the emitting device comprising:
  at least one light source for generating at least one optical emission signal; and
  at least one diffraction unit, which has a diffractive effect on the at least one emission signal, for controlling at least one beam direction of the at least one emission signal,
  wherein the at least one diffraction unit, which is settable to set the beam directions associated with respective signal paths, is arranged in at least two different signal paths of one emission signal or various emission signals,
  wherein at least one beam alignment unit is arranged in the respective signal paths after the at least one diffraction unit to align the set beam directions in the at least one monitoring region while maintaining at least one angle offset between the set beam directions generated before the at least one beam alignment unit or while generating at least one angle offset between the set beam directions.

2. The emitting device according to claim 1, wherein an angle offset between at least two set beam directions corresponds to a full width at half maximum of at least one of the diffracted emission signals.

3. The emitting device according to claim 1, wherein at least one beam alignment unit comprises at least one polarizing beam splitter and/or at least one prism arrangement.

4. The emitting device according to claim 1, wherein at least one diffraction unit comprises an optical phased array.

5. The emitting device according to claim 1, wherein at least one emission signal incident on at least one diffraction unit is circularly polarized.

6. The emitting device according to claim 1, wherein at least one diffracted emission signal incident on at least one beam alignment unit is linearly polarized.

7. The emitting device according to claim 1, wherein the at least one diffracted emission signal or the different diffracted emission signals, which are incident on the at least two signal paths on at least one beam alignment unit are linearly polarized obliquely, in particular perpendicularly, in relation to one another.

8. The emitting device according to claim 1, wherein at least one component changing a polarization of the corresponding emission signal comprising a quarter-wave plate, is arranged in at least one respective signal path before and/or after at least one diffraction unit.

9. The emitting device according to claim 1, wherein at least one polarizing beam splitter is arranged in a respective signal path between the at least one light source and the at least one diffraction unit.

10. The emitting device according to claim 1, wherein at least one beam-deflecting component, in particular at least one prism, is arranged in at least one signal path before and/or after at least one diffraction unit and possibly before and/or after at least one polarization-changing component.

11. The emitting device according to claim 1, wherein at least one optical lens is arranged in at least one signal path before and/or after at least one diffraction unit.

12. A detection system of a vehicle for monitoring a monitoring region for objects, comprising:
at least one emitting device, having at least one light source for generating at least one optical emission signal and having at least one diffraction unit, which has a diffractive effect on the at least one emission signal, for controlling at least one beam direction of the at least one emission signal,
at least one receiving device for receiving at least one optical reception signal, which originates from at least one emission signal, which is reflected at an object,
and at least one control and/or analysis unit for controlling the at least one emitting device and/or the at least one receiving device and/or for analysing reception signals received using the at least one receiving device,
wherein at least one diffraction unit, which is settable to set the beam directions associated with the respective signal paths, is arranged in at least two different signal paths of one emission signal or various emission signals, and
wherein at least one beam alignment unit is arranged in the respective signal paths after the at least one diffraction unit to align the set beam directions in the at least one monitoring region while maintaining at least one angle offset between the set beam directions generated before the at least one beam alignment unit or while generating at least one angle offset between the set beam directions.

13. A driver assistance system of a vehicle, comprising:
at least one scanning optical detection system for monitoring a monitoring region for objects, wherein the at least one detection system comprises:
at least one emitting device, having at least one light for generating at least one optical emission signal and having at least one diffraction unit, which has a diffractive effect on the at least one emission signal, for controlling at least one beam direction of the at least one emission signal,
at least one receiving device for receiving at least one optical reception signal, which originates from at least one emission signal, which is reflected at an object, and
at least one control and/or analysis unit for controlling the at least one emitting device and/or the at least one receiving device and/or for analysing reception signals received using the at least one receiving device; and
at least one control and/or analysis unit for processing items of object information acquired using the at least one detection system,
wherein at least one diffraction unit, which is settable to set the beam directions associated with the respective signal paths, is arranged in at least two different signal paths of one emission signal or various emission signals,
at least one beam alignment unit is arranged in the respective signal paths after the at least one diffraction unit to align the set beam directions in the at least one monitoring region while maintaining at least one angle offset between the set beam directions generated before the at least one beam alignment unit, or while generating at least one angle offset between the set beam directions.

14. A method for optically scanning a monitoring region for objects using a detection system of a vehicle, the method comprising:
generating at least one optical emission signal and diffracting the at least one optical emission signal using at least one diffraction unit, which has a diffractive effect, to control at least one beam direction of the at least one emission signal,
wherein one emission signal or various emission signals are emitted in at least two different signal paths to at least one diffraction unit,
wherein respective beam directions, which are associated with the respective signal paths, of the at least one emission signal are set using the at least one diffraction unit and the set beam directions are aligned in the at least one monitoring region, and
wherein at least one angle offset is generated between the set beam directions before or after the at least one diffraction unit.

* * * * *